US008463459B2

(12) United States Patent
Breshears

(10) Patent No.: US 8,463,459 B2
(45) Date of Patent: Jun. 11, 2013

(54) METHODS AND APPARATUS FOR INDICATING A LOCATION

(75) Inventor: Brian Richard Breshears, Kent, WA (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 12/862,250

(22) Filed: Aug. 24, 2010

(65) Prior Publication Data

US 2012/0053757 A1  Mar. 1, 2012

(51) Int. Cl.
*G05D 1/00* (2006.01)
(52) U.S. Cl.
CPC .................................. *G05D 1/0022* (2013.01)
USPC ............. 701/2; 701/30.1; 701/468; 701/469; 701/474; 455/11.1; 455/12.1; 455/13.1; 455/7; 342/353; 342/357.47; 342/357.48
(58) Field of Classification Search
CPC . G01S 19/11; G01S 19/41; G01S 19/21; G01S 19/49; G01S 19/51; G05D 1/0022; G05D 1/0038; G05D 1/0274; G01C 21/28; G01C 21/51
USPC ................................... 701/2, 30; 342/357.48
See application file for complete search history.

(56) References Cited

U.S. PATENT DOCUMENTS

| 2003/0097216 | A1* | 5/2003 | Etnyre ........................... 701/120 |
| 2006/0167618 | A1* | 7/2006 | Werback ........................ 701/120 |
| 2009/0128412 | A1 | 5/2009 | Ryu et al. | |
| 2009/0201850 | A1* | 8/2009 | Davis et al. .................... 370/328 |
| 2010/0049376 | A1 | 2/2010 | Schultz | |

FOREIGN PATENT DOCUMENTS

| EP | 2136222 A1 | 12/2009 |
| WO | 9528650 | 10/1995 |

OTHER PUBLICATIONS

Yoshiaki Kuwata, Real-time trajectory design for unmanned aerial vehicles using receding horizon control, Jun. 2003, MIT Department of Aeronautics and Astronautics.*
International Search Report and Written Opinion of PCT/US2011/045095; Oct. 25, 2011; 15 pages.
K. O'Keefe, J. Sharma, M.E. Gannon & G. Lachapelle, Pseudolite-Based Inverted GPS Concept for Local Area Positioning, Sep. 16, 1999, 22 pages, ION GPS99—Nashville, TN.
Doyoon Kim, Byungwoon Park, Sanghyo Lee, Am Cho, Jihoon Kim, Changdon Kee, Design of Efficient Navigation Message Format for UAV Pseudolite Navigation System, IEE Transaction on Aerospace and Electronic Systems, Oct. 2008, 14 pages, vol. 44, No. 4.
Michael A. Ciampa, Failure Detection of a Pseudolite-Based Reference System Using Residual Monitoring,AFIT/GE/ENG/09-08, Mar. 2009, 116 pages, Ohio.

* cited by examiner

*Primary Examiner* — M. Thein
*Assistant Examiner* — Milena Racic
(74) *Attorney, Agent, or Firm* — Armstrong Teasdale LLP

(57) ABSTRACT

According to one embodiment, a method for providing location information to a mobile receiver from a plurality of aerial vehicles is provided. The method includes receiving a source location from at least three location sources at each aerial vehicle of the plurality of aerial vehicles. The at least three location sources includes a remote aerial vehicle. A predicted location of the aerial vehicle at a future time is calculated at each aerial vehicle based at least in part on a current time at the aerial vehicle, the received source locations, and ephemeris data that represents motion of each remote aerial vehicle. The predicted location is transmitted at the future time at each aerial vehicle. The transmitted locations from the aerial vehicles are used by a mobile receiver to determine a current location of the mobile receiver.

9 Claims, 4 Drawing Sheets ns and Apparatus for Indicating a Location

BACKGROUND

The field of the disclosure relates generally to positioning systems and, more specifically, to systems that provide location information to a mobile receiver in the absence of usable location signals from satellites or ground stations.

Satellites, such as Global Positioning System (GPS) satellites, are often used to communicate location and time information to mobile receivers. In at least some known systems, a receiver calculates its location based on the transmitted location and time information. In addition, a satellite may transmit ephemeris data representing the motion (e.g., the orbital path) of the satellite, and the receiver may use the ephemeris data in calculating its location.

Satellite-based positioning systems are generally susceptible to localized interference measures ("jamming") due to the relatively weak signal emitted by the satellites. In addition, it is possible that one or more of the satellites within the positioning systems could become inoperable, intentionally or otherwise. Ground-based positioning systems transmitting a predetermined location may be used as a replacement for satellites, but such positioning systems have limited range and may be susceptible to natural disasters or attack.

BRIEF DESCRIPTION

In one aspect, a method for providing location information to a mobile receiver from a plurality of aerial vehicles is provided. The method includes receiving a source location from at least three location sources at each aerial vehicle of the plurality of aerial vehicles. The at least three location sources includes a remote aerial vehicle. A predicted location of the aerial vehicle at a future time is calculated at each aerial vehicle based at least in part on a current time at the aerial vehicle, the received source locations, and ephemeris data that represents motion of each remote aerial vehicle. The predicted location is transmitted at the future time at each aerial vehicle. The transmitted locations from the aerial vehicles are used by a mobile receiver to determine a current location of the mobile receiver.

In another aspect, a positioning system is provided. The positioning system includes a first set of one or more aerial vehicles and a second set of a plurality of aerial vehicles. The first set includes at least one aerial vehicle configured to transmit a location of the aerial vehicle. Each aerial vehicle of the second set is configured to receive a location from at least three location sources. The at least three location sources includes an aerial vehicle of the first set of aerial vehicles. Each aerial vehicle of the second set is also configured to calculate a predicted location of the aerial vehicle at a future time based at least in part on the received locations and to transmit the predicted location to one or more receivers at the future time.

In yet another aspect, an aerial vehicle is provided. The aerial vehicle includes a receiver that is configured to receive a source location from a plurality of location sources. The location sources include a remote aerial vehicle. The aerial vehicle also includes one or more processors that are communicatively coupled to the receiver and programmed to determine a location of the aerial vehicle based at least in part on the received source locations and to generate ephemeris data representing motion of the aerial vehicle. The aerial vehicle further includes a transmitter that is communicatively coupled to the processors and configured to transmit the determined location of the aerial vehicle and the generated ephemeris data.

In still another aspect, one or more computer-readable storage media have computer-executable instructions embodied thereon are provided. When executed by at least one processor, the computer-executable instructions cause the at least one processor to receive a source location from at least three location sources. The at least three location sources includes a first remote aerial vehicle. The computer-executable instructions also cause the at least one processor to calculate a location based at least in part on a current time, the received source locations, and ephemeris data representing motion of the first remote aerial vehicle and to transmit the location to at least one of a second remote aerial vehicle and a mobile receiver.

The features, functions, and advantages that have been discussed can be achieved independently in various embodiments of the invention or may be combined in yet other embodiments, further details of which can be seen with reference to the following description and drawings.

DETAILED DESCRIPTION

In various embodiments, an apparatus and method for providing location information are provided. Such embodiments facilitate accurate determination of location by mobile receivers in the absence of usable satellite-based or ground-based positioning signals.

Embodiments provided herein facilitate extending geodesy service from known points using positioning hardware coupled onboard aerial vehicles. Aerial vehicles may include, without limitation, one or more of a fixed wing aircraft, a rotary wing aircraft, a balloon, and any other vehicle capable of air travel, whether piloted or unpiloted (e.g., remotely operated).

As used herein, a "location source" is any device that transmits location information such as, without limitation, one or more of a location of the device, a time at which the location information is transmitted, and ephemeris data indicating motion of the device, if any. Location sources may include satellites, such as Global Positioning System (GPS) satellites or surrogate satellites (e.g., Iridium satellites), ground stations, and vehicles, such as the aerial vehicles described herein. Methods described herein facilitate extending the positioning capability provided by any location sources to an area that is larger than or remote to the area covered directly by those location sources, and to an area in which access to those location sources is otherwise unavailable.

Figure 1:
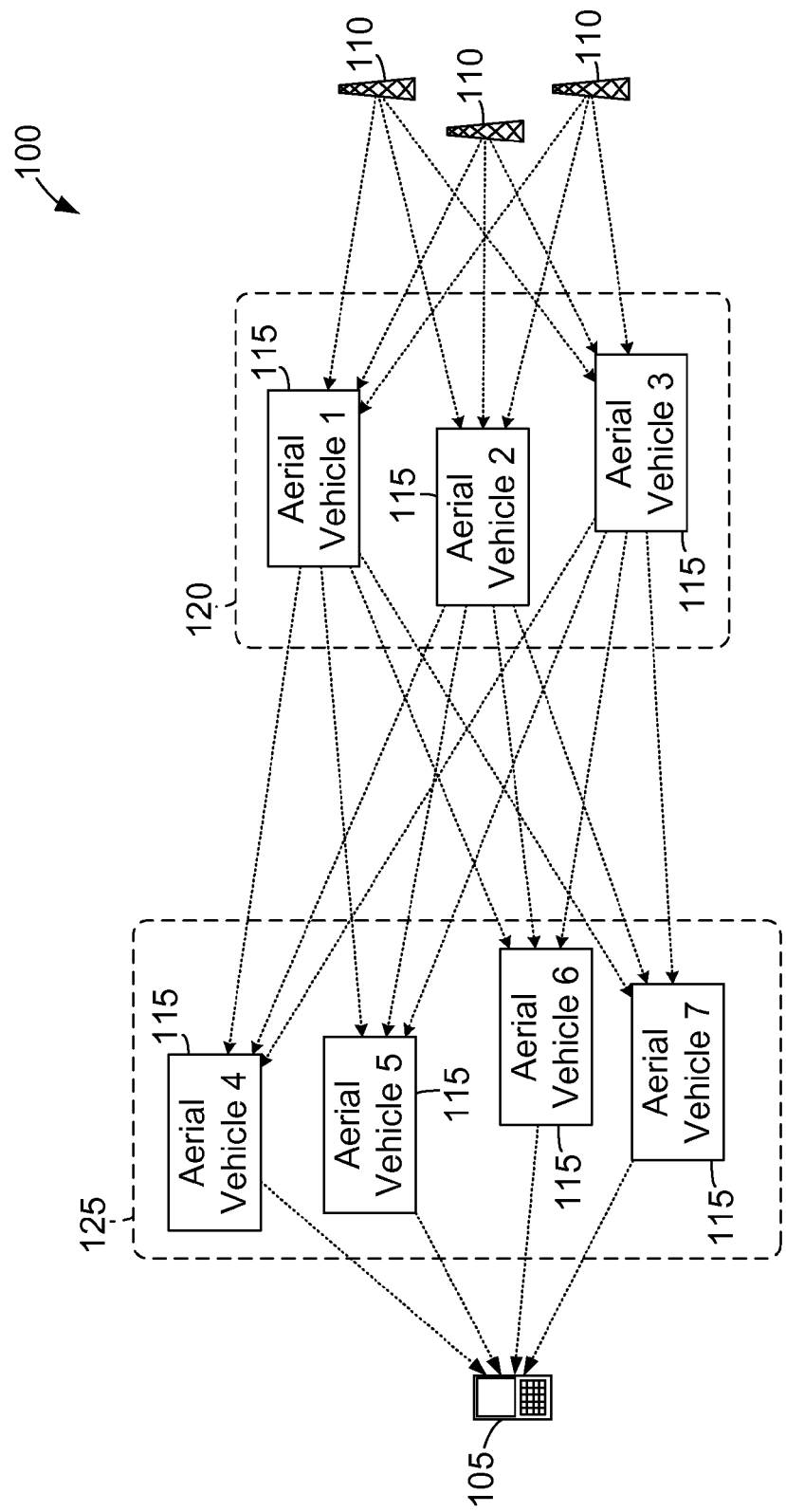
FIG. 1 is a block diagram illustrating an exemplary positioning system.

FIG. 1 is a block diagram illustrating an exemplary positioning system 100. Within system 100, a mobile receiver 105 requires location information. For example, mobile receiver 105 may include a surface-based device, such as a handheld Global Positioning System (GPS) receiver, a vehicle-based navigation system, or a targeting system. In the exemplary embodiment, a plurality of ground stations 110 are configured to transmit location information for use by mobile receiver 105. In some embodiments, each ground station 110 is associated with a predetermined location and is configured to transmit (e.g., broadcast) the predetermined location and the time at which the location is being transmitted. In one embodiment, ground stations 110 are Differential GPS (DGPS) stations.

In the exemplary embodiment, mobile receiver 105 is capable of receiving the transmitted information from three or more ground stations 110, and mobile receiver 105 can determine its location based the received information. However, in some scenarios, direct reception of location information from ground stations 110 at mobile receiver 105 is not feasible or not possible due to factors such as the distance between mobile receiver 105 and ground stations 110 or the absence of a clear line of sight between mobile receiver 105 and ground stations 110. For example, a clear line of sight between mobile receiver 105 and a ground station 110 may not exist if one or more obstructions (e.g., a structure or a geographical feature) are located between mobile receiver 105 and ground station 110. Depending on the distance at which mobile receiver 105 is positioned from ground stations 110, the curvature of the Earth may create such an obstruction.

The positioning service provided by ground stations 110 may be extended to mobile receiver 105 by using a plurality of aerial vehicles 115, such as unpiloted aerial vehicles (UAVs). In the exemplary embodiment, a first set 120 of aerial vehicles 115 is positioned within the communication range of ground stations 110. Each aerial vehicle 115 included in first set 120 receives location information from ground stations 110, determines a predicted location of the aerial vehicle 115, and transmits (e.g., broadcasts) location information that may include, but is not limited to only including, the predicted location, the time at which the predicted location is transmitted, and ephemeris data representing motion of aerial vehicle 115. For example, ephemeris data may be generated by the aerial vehicle 115 based on one or more of a current velocity, a programmed flight path for the aerial vehicle 115, and a current time at the aerial vehicle 115.

A second set 125 of aerial vehicles 115 is positioned remotely to, but within the communication range of, first set 120. For example, one or both of first set 120 and second set 125 of aerial vehicles 115 may be positioned at altitudes that enable signal communication between first set 120 and second set 125. Further, in the exemplary embodiment, the altitudes may be selected to facilitate extending the communication range of aerial vehicles 115 (e.g., by avoiding obstruction by the Earth), to facilitate reducing energy consumption of aerial vehicles 115, or to facilitate protecting aerial vehicles 115 from interference or attack.

Second set 125 is also positioned within the communication range of mobile receiver 105. As such, each aerial vehicle 115 in second set 125 of aerial vehicles 115 receives location information from three or more location sources that are not associated with or located in second set 125. For example, each aerial vehicle 115 may receive location information from one or both of predetermined location sources and location sources positioned at a distance from aerial vehicle 115 that is greater than a predetermined threshold distance.

In the exemplary embodiment, each of four aerial vehicles 115 in second set 125 receives location information from each of three aerial vehicles 115 in first set 120. Based at least in part on a current time and the received location information, each aerial vehicle 115 of second set 125 determines its own location. Each aerial vehicle 115 of second set 125 then transmits location information, which mobile receiver 105 uses to determine the location of mobile receiver 105. In the exemplary embodiment, mobile receiver 105 determines its own location based on location information from four location sources. Each aerial vehicle 115 has access to the current time (e.g., from an onboard atomic clock) and is operable to determine its own location based on the current time and location information from three location sources.

In some embodiments, aerial vehicles 115 are unpiloted, remotely operated, or both. Prior to, or after deployment, aerial vehicles 115 may be programmed with a flight path. For example, the flight path may instruct an aerial vehicle 115 to fly to one or more predetermined locations and at one or more predetermined altitudes and then to travel in an orbit (e.g., a circular or elliptical pattern) upon reaching the predetermined location. In one embodiment, aerial vehicles 115 within second set 125 may be instructed with a flight path that defines an orbit proximate to mobile receiver 105 and at an altitude high enough to facilitate protecting aerial vehicles 115 from ground-based attack. For example, in one embodiment, aerial vehicles 115 may orbit at an altitude of over 10,000 feet.

Aerial vehicles 115 may require occasional refueling. Accordingly, in some embodiments, aerial vehicles 115 may be selectively diverted or rotated through an area or a set. For example, as aerial vehicles 115 within second set 125 approach a time frame for refueling, replacement aerial vehicles 115 may be dispatched to the area of second set 125. When replacement aerial vehicles 115 reach the area, those replacement aerial vehicles 115 begin receiving and transmitting location information, and the original aerial vehicles 115 within second set 125 may be directed to a maintenance facility, which may include a refueling station. Such embodiments enable continuous positioning service to be provided to mobile receiver 105. In some embodiments, an atomic clock onboard aerial vehicle 115 is synchronized with a reference time source at the maintenance facility prior to each deployment or launch of aerial vehicle 115.

Figure 2:
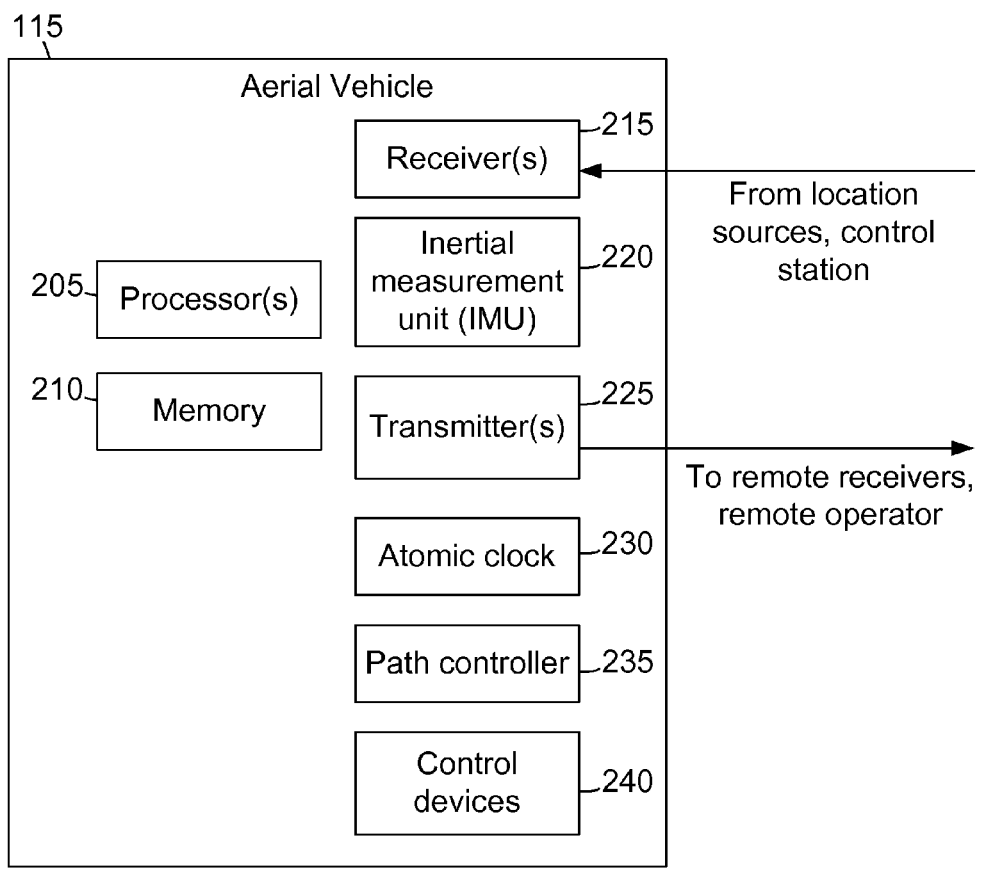
FIG. 2 is a block diagram illustrating an exemplary aerial vehicle that may be used with the positioning system shown in FIG. 1.
Figure 3:
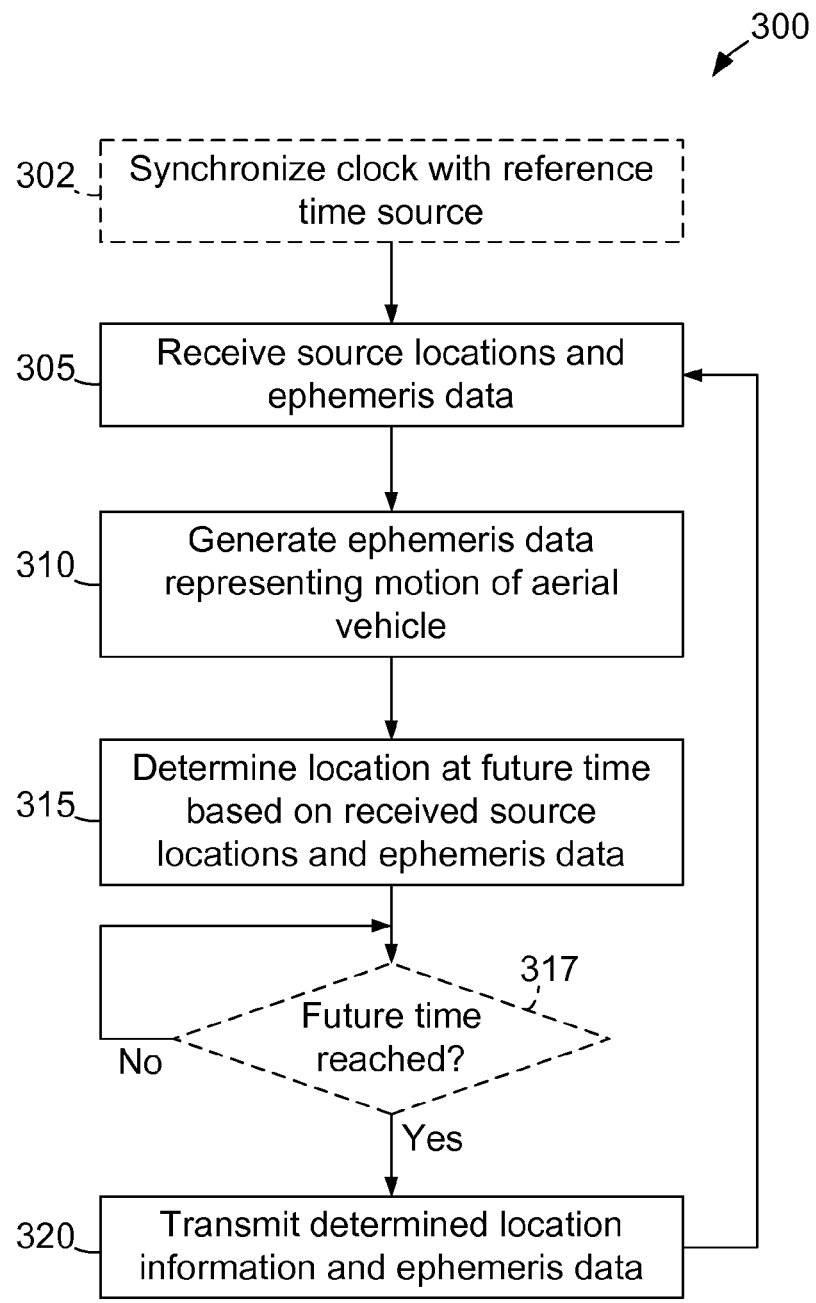
FIG. 3 is a flowchart illustrating an exemplary method for use in providing location information to a receiver.

FIG. 2 is a block diagram illustrating an exemplary aerial vehicle 115 that may be used with positioning system 100. FIG. 3 is a flow chart illustrating an exemplary method 300 that may be used to provide location information to a receiver, such as mobile receiver 105 (shown in FIG. 1), using aerial vehicle 115.

In the exemplary embodiment, aerial vehicle 115 includes one or more processors 205 and a memory device 210. Processor 205 is programmed to execute computer-executable instructions, which may be stored in memory device 210, to operate aerial vehicle 115, including components thereof. For example, any or all of the operations described herein may be encoded as computer-executable instructions and executed by processor 205. Memory device 210 may also be configured to store data associated with a configuration of aerial vehicle 115, a flight path for aerial vehicle 115, ephemeris data representing motion of aerial vehicle 115, and any other data suitable for use with the methods described herein.

In the exemplary embodiment, aerial vehicle 115 includes one or more receivers 215 that are communicatively coupled to processor 205. Receiver 215 receives 305 location information from a plurality of location sources that may include, but are not limited to only including, ground stations 110 (shown in FIG. 1), positioning satellites (e.g., GPS satellites, shown in FIG. 4), and other aerial vehicles 115. Such location information includes, but is not limited to only including, one or more of a source location (e.g., the location of the location source), a time at which the location information is transmitted (e.g., a date/time stamp), and ephemeris data representing motion of the location source.

Processor 205 is programmed to generate 310 ephemeris data representing motion of aerial vehicle 115. In some embodiments, aerial vehicle 115 includes an inertial measurement unit (IMU) 220 that provides velocity data, orientation data, or both. The ephemeris data may be generated 310 based at least in part on the data provided by IMU 220.

In the exemplary embodiment, processor 205 determines 315 an instantaneous or predicted location of aerial vehicle 115 based at least in part on the received location information. In one example, a predicted location is determined 315 by initially calculating an instantaneous location based on received location information from receiver 215, and then calculating a predicted location based on the instantaneous location and the velocity data, orientation data, or both, provided by IMU 220.

Aerial vehicle 115 includes one or more transmitters 225 that are communicatively coupled to processor 205. Each transmitter 225 transmits 320 (e.g., broadcasts) location information, including the determined location of aerial vehicle 115 and the ephemeris data. In an exemplary embodiment, transmitter 225 includes a communication device that is operable to be used as a substitute for a positioning satellite. Such a communication device may be referred to as a "pseudo-satellite" or "pseudolite." In some embodiments, receiver 215 receives 305 location information using a first frequency, and transmitter 225 transmits 320 location information using a second frequency. In such embodiments, interference between receiver 215 and transmitter 225 within aerial vehicle 115 is substantially eliminated.

In some embodiments, transmitter 225 controls an intensity of the signal carrying location information. For example, processor 205 may determine a distance between aerial vehicle 115 and one or more targets (e.g., remote aerial vehicles, surface-based receivers, or both), and transmitter 225 may transmit 320 location information with a signal intensity that varies directly with the distance. In addition to, or alternative to, transmitter 225 may transmit 320 location information using beam shaping to limit propagation of the signal to the area(s) in which the targets are positioned.

Location information may include a time/date at which a location is determined or a time/date at which the location information is transmitted. A time value may be used in conjunction with a location in determining 315 a location of aerial vehicle 115. For example, a transmission time may be subtracted from a current time to determine a propagation delay between a location source and aerial vehicle 115. A distance between the location source and the aerial vehicle 115 may be derived from the propagation delay.

In some embodiments, aerial vehicle 115 includes an atomic clock 230 that provides a time signal indicative of a current time. Atomic clock 230 may be synchronized 302 with a reference time source, such as another atomic clock, that is used to synchronize one or more location sources. For example, the synchronization 302 may be performed upon maintenance to aerial vehicle 115 or prior to launching aerial vehicle 115.

In the exemplary embodiment, the location determined 315 is indicative of a predicted location of aerial vehicle 115 at a future time. The predicted location may be based on a predicted motion or displacement of aerial vehicle 115 between the current time and the future time (e.g., as indicated by the velocity data, orientation data, or both, provided by IMU 220). After determining 315 the predicted location, atomic clock 230 is used to determine 317 whether the future time has been reached. When the future time is reached (e.g., when the current time reported by atomic clock 230 is equal to or greater than the future time), transmitter 225 transmits 320 the location information, which may include the time of transmission.

In some embodiments, aerial vehicle 115 is operated remotely, autonomously, or a combination of both. In such embodiments, receiver 215 may receive instructions, such as navigation input and control input, from one or more remote control stations (not shown). For example, receiver 215 may receive a flight path defining a route or path of travel for aerial vehicle 115. The flight path may include an orbit at a predetermined location (e.g., including a predetermined altitude). In one embodiment, aerial vehicle 115 determines its location and its motion in accordance with the methods described herein and navigates along a flight path using the determined location and motion.

Instructions received by receiver 215 may be provided to a path controller 235. Path controller 235 receives the instructions and interacts with other systems, such as one or more of a vehicle management system (VMS) and a mission management system (MMS), either of which may be executed by processor 205. For example, the VMS may operate one or more control devices 240, such as, without limitation, a flight control surface (e.g., an aileron, an elevator, or a rudder), a throttle, a motor, a valve, an actuator, and a switch, used to pilot aerial vehicle 115. The MMS may manage a desired orbit for aerial vehicle 115, whether pre-programmed or received via receiver 215. Aerial vehicle 115 may also include one or more transmitters 225 that are configured to transmit data, such as telemetry data or video from an onboard camera (not shown) to a remote operator.

Because embodiments including automated or remote control of aerial vehicle 115 do not require an onboard human pilot, such embodiments facilitate long-term deployment (e.g., days or weeks) of aerial vehicle 115 to a theater of operations. For example, aerial vehicle 115 may be programmed with a flight path defining a route from a base to a destination, an orbit over the destination, and a return flight path defining a route from the destination to the base. Further, such embodiments enable operation of aerial vehicle 115 within the stratosphere, which requires significant accommodations (e.g., pressurization) for piloted flight.

Figure 4:
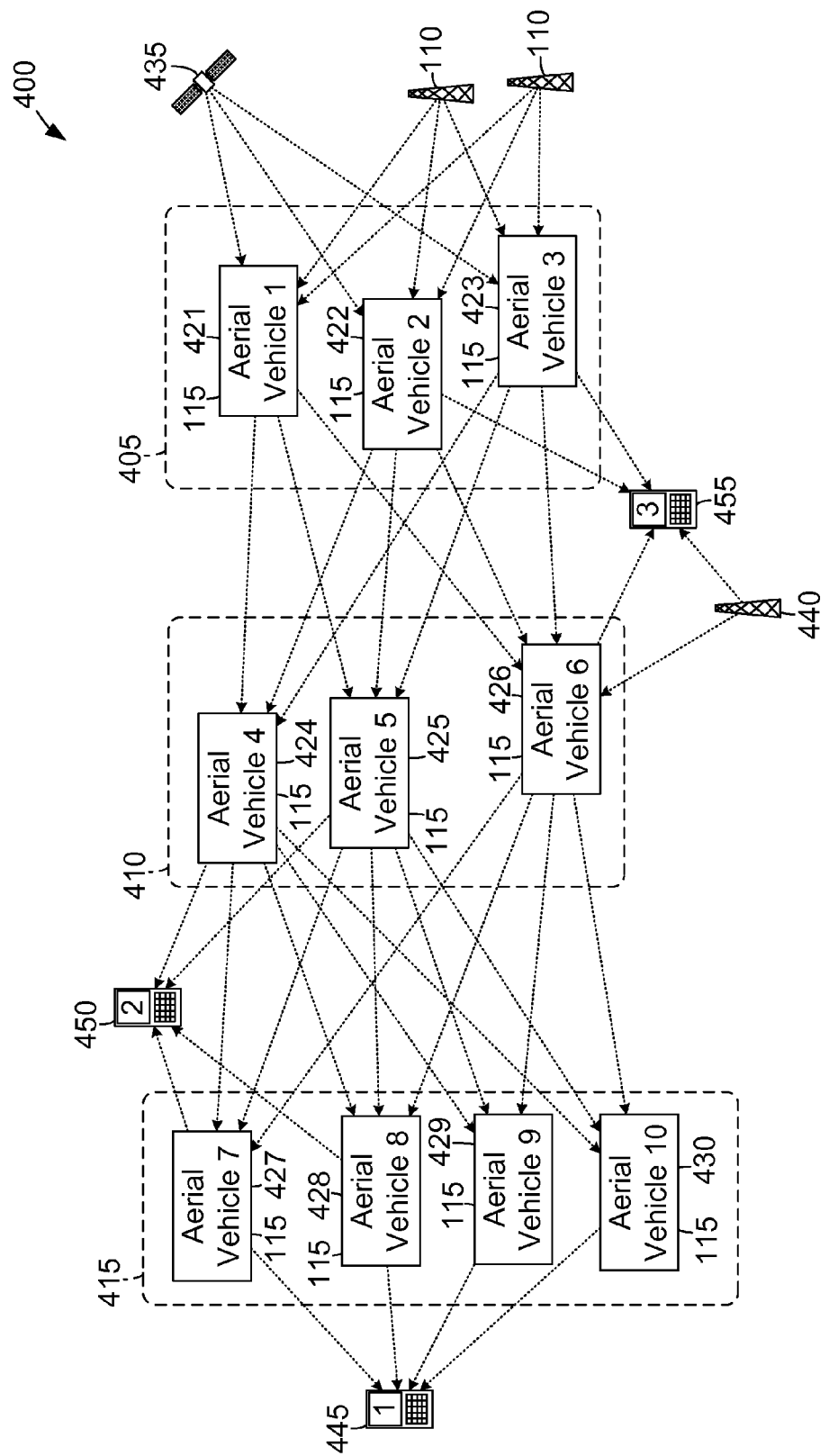
FIG. 4 is a block diagram illustrating an exemplary positioning system with three sets of aerial vehicles.

FIG. 4 is a block diagram illustrating an exemplary positioning system 400 that uses three sets of aerial vehicles 115. In the exemplary embodiment, system 400 includes a first set 405, a second set 410, and a third set 415 of aerial vehicles 115. First set 405 includes a first aerial vehicle 421, a second aerial vehicle 422, and a third aerial vehicle 423. Second set 410 of aerial vehicles 115 includes a fourth aerial vehicle 424, a fifth aerial vehicle 425, and a sixth aerial vehicle 426. Third set 415 of aerial vehicles includes a seventh aerial vehicle 427, an eighth aerial vehicle 428, a ninth aerial vehicle 429, and a tenth aerial vehicle 430.

Aerial vehicles 115 within first set 405 receive location information from two ground stations 110 and a satellite 435, such as a satellite in a medium Earth orbit (MEO) or in a low Earth orbit (LEO). In the exemplary embodiment, the first set 405 transmits location information, and each aerial vehicle 115 in second set 410 determines its own location based on the location information received from first set 405.

Sixth aerial vehicle 426 within second set 410 also receives location information from an additional ground station 440. In one embodiment, the sixth aerial vehicle 426 determines its location based further on the location information received from ground station 440. In another embodiment, the sixth aerial vehicle 426 provides a higher weight to ground station 440 than to a first aerial vehicle 421 when determining its location. For example, the sixth aerial vehicle 426 may assign weight to ground station 440 with a greater weight than is assigned to first aerial vehicle 421 based on a location source type (e.g., ground station, aerial vehicle, and satellite), a location source reliability, or both.

Each aerial vehicle 115 in second set 410 transmits location information, and each aerial vehicle 115 within a third set 415 determines its location based on the location information received from second set 410. Aerial vehicles 115 in third set 415 also transmit location information, from which a first mobile receiver 445 determines the location of first mobile receiver 445. While the exemplary embodiment illustrates only using three sets of aerial vehicles 115 to extend location information from ground stations 110 and satellite 435 to first mobile receiver 445, any number of aerial vehicles 115 may be used, thus increasing the distance across which location information may be propagated.

Mobile receivers need not receive location information only from those aerial vehicles 115 within a single group. For example, a second mobile receiver 450 determines its location based on location information received from aerial vehicles 115 within both second set 410 and third set 415. A third mobile receiver 455 determines its location using location information from second aerial vehicle 422, third aerial vehicle 423, sixth aerial vehicle 426, and ground station 440. As illustrated by these examples, any three or more location sources may be combined to determine the location of an aerial vehicle 115 (e.g., in combination with a current time from an onboard atomic clock), and any four or more location sources may be combined to determine the location of a mobile receiver.

Methods and apparatus described herein facilitate using aerial vehicles to extend positioning capability from a plurality of known, controlled location sources, such as ground stations and satellites, to an area from which such location sources are not directly accessible. Accordingly, a surface-based receiver may accurately determine its location based on location information transmitted by the aerial vehicles even when it is infeasible to receive conventional, satellite-based signals or ground station signals directly at the surface-based receiver.

Embodiments are described herein with reference to particular positioning system configurations. However, it is contemplated that the methods and apparatus described are operable with any quantity of aerial vehicles, ground stations, satellites, and receivers suitable for use with the methods described herein.

The subject matter of the present disclosure is described with specificity herein to meet statutory requirements. However, the description itself is not intended to limit the scope of this patent. Rather, it has been contemplated that the claimed subject matter might also be embodied in other ways, to include different steps or combinations of steps similar to the ones described in this document, in conjunction with other present or future technologies. Moreover, although the terms "step," "block," or "operation" may be used herein to connote different elements of methods employed, the terms should not be interpreted as implying any particular order among or between various steps herein disclosed unless and except when the order of individual steps is explicitly described.

The methods described herein may be encoded as executable instructions embodied in a computer readable medium, including, without limitation, a storage device or a memory area of a computing device. Such instructions, when executed by one or more processors, cause the processor(s) to perform at least a portion of the methods described herein.

This written description uses examples to disclose the described embodiments, including the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for providing location information to a mobile receiver from a plurality of aerial vehicles, the method comprising:
  receiving, at each aerial vehicle of the plurality of aerial vehicles, a source location from at least three location sources, wherein the at least three location sources include at least one remote aerial vehicle;
  calculating, at each aerial vehicle, a predicted location of the aerial vehicle of the plurality of aerial vehicles at a future time based at least on a current time at the aerial vehicle, the received source locations, and ephemeris data representing motion of each remote aerial vehicle; and
  transmitting, at each aerial vehicle, the predicted location at the future time, wherein the transmitted locations from the aerial vehicles are used by a mobile receiver to determine a current location of the mobile receiver.

2. A method in accordance with claim 1, further comprising, receiving, at a first aerial vehicle of the plurality of aerial vehicles, a source location from at least three aerial vehicles other than the first aerial vehicle.

3. A method in accordance with claim 1, further comprising transmitting the predicted location from a first aerial vehicle of the plurality of aerial vehicles to a remote aerial vehicle that is not included in the plurality of aerial vehicles.

4. A method in accordance with claim 3, wherein transmitting the predicted location to a remote aerial vehicle comprises transmitting the predicted location to an aerial vehicle that does not have a clear line of sight to the location sources from which the first aerial vehicle received source locations.

5. A method in accordance with claim 1, wherein each aerial vehicle includes an atomic clock, the method further comprising synchronizing the atomic clocks of each aerial vehicle with a reference time source.

6. A positioning system comprising:
  a first set of one or more aerial vehicles including at least one aerial vehicle configured to transmit a location of the aerial vehicle; and
  a second set of a plurality of aerial vehicles, each of the plurality of aerial vehicles in the second set being configured to:
    receive a location from at least three location sources, wherein the at least three location sources each include an aerial vehicle of the first set of aerial vehicles;
    calculate a predicted location of the aerial vehicle at a future time based at least on the received locations; and
    transmit the predicted location to one or more receivers at the future time.

7. A positioning system in accordance with claim 6, wherein each aerial vehicle of the second set of aerial vehicles is configured to receive a location from at least three aerial vehicles of the first set of aerial vehicles.

8. A positioning system in accordance with claim 6, further comprising at least one ground station configured to transmit a predetermined location of the ground station, wherein each aerial vehicle of the second set of aerial vehicles is further configured to receive a location from the ground station.

9. A positioning system in accordance with claim 6, further comprising a mobile receiver configured to:
  receive the transmitted locations from the second set of aerial vehicles; and
  determine a location of the mobile receiver based at least in part on the received locations.

\* \* \* \* \*